Dec. 15, 1931. C. B. HUDSON 1,836,850
FULL CIRCLE RETREAD VULCANIZER
Filed April 6, 1928 2 Sheets-Sheet 1

INVENTOR.
CHARLES B. HUDSON.
BY Ely & Barrow
ATTORNEYS.

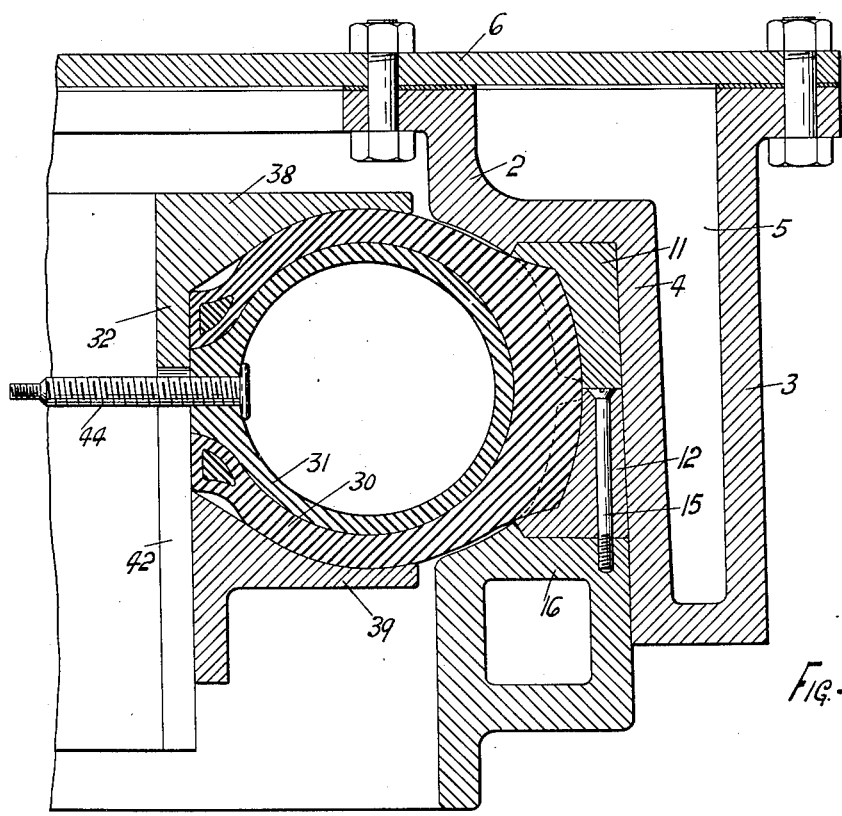

Patented Dec. 15, 1931

1,836,850

UNITED STATES PATENT OFFICE

CHARLES B. HUDSON, OF AKRON, OHIO, ASSIGNOR TO THE AKRON STANDARD MOLD COMPANY, OF AKRON, OHIO, A CORPORATION OF OHIO

FULL CIRCLE RETREAD VULCANIZER

Application filed April 6, 1928. Serial No. 267,889.

The present invention relates to the art of repairing automobile tires and particularly to the operation known as retreading in which the entire circumference or tread of the tire is vulcanized at a single operation. In the repair of tires it is often desirable to completely retread a whole tire casing at a single operation and the object of the present invention is to design and construct a vulcanizer in which this operation can be carried out rapidly, economically and efficiently.

The advantages and benefits of the present invention will be apparent to those skilled in this art, and will be readily understood from the drawings and description accompanying this application. It will also be understood that modifications and improvements may be made in details of the apparatus which fall within the scope of the invention as set forth in the claims hereto appended.

In the drawings in which is shown the best form of the invention as known at present, Figure 1 is a side elevation of a complete retreading unit;

Figure 3 is an enlarged detail on the line 3—3 of Figure 1; and

Figure 4 is an enlarged detail on the line 4—4 of Figure 1.

Figures 1, 2:
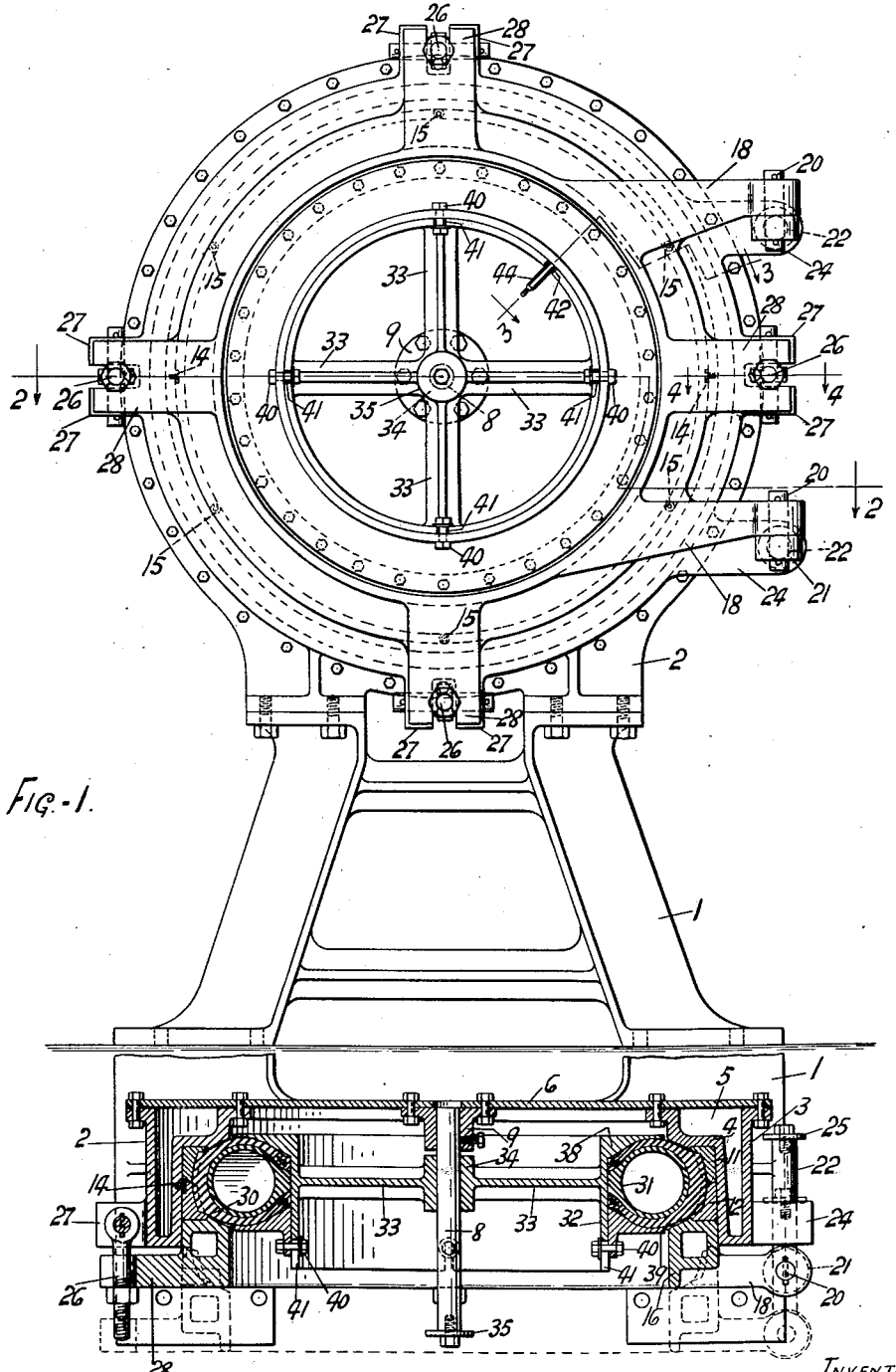
Figure 2 is a section on the line 2—2 of Figure 1.

The apparatus consists of a base or standard 1 to the upper surface of which is secured the vertical casing 2 which is formed of an outer wall 3 and a spaced inner wall 4 enclosing a chamber 5 for the circulation of steam or other heating medium. The rear of the casing is enclosed by a plate 6. In the center of the plate and at the center of the casing is fixed the stationary shaft 8 which is supported at its inner end by a cap plate 9 secured to the back plate.

The inner surface of the inner wall 4 is tapered slightly so as to give the proper draft for the two part tread ring 11 and 12. The inner tread ring 11 is fitted within the inner wall being secured in position by keys 14. The outer tread ring 12, which is positioned by the keys 14 so as to secure the proper register, is secured by bolts 15 to a chambered door or movable member 16. The inner surfaces of the tread rings are provided with the usual patterns to reproduce the desired non-skid design in the retreaded tire.

The door or closure 16 is chambered for the circulation of the heating medium and is provided with two parallel brackets 18 which are hinged upon pintles 20 which are located in eyes 21 formed on the ends of sliding bearing rods 22 which are movable through lugs 24 formed at the side of the casing 2. The outer limit of movement of the rods is determined by stop collars 25 secured to the inner ends of the bearing rods. It will be observed that with this construction it is possible to move the door outwardly in a straight line until the outer tread ring 12 clears the tire whereupon the door can be swung outwardly, permitting access to the interior of the vulcanizer. When the door is closed it is clamped in position by means of swinging bolts 26 located at suitable intervals about the vulcanizer, the bolts being pivotally mounted in lugs 27 on the casing 2 and receivable in forked arms 28 formed on the door.

The tire 30 which is to be retreaded, is supported with its air bag 31 upon the outer surface of a ring shaped carrier 32 at the ends of arms 33 radiating from a central hub 34. The hub is slidable over the shaft 8, being movable into and out of the cavity within the vulcanizer, and is halted by the stop plate 35 at the outer end of the shaft. The sidewalls of the tire are supported at the rear by a stationary flange 38 formed on the carrier, this flange approaching the interior of the vulcanizing cavity. The opposite side of the tire is supported by a removable flange 39 adjustably mounted in the carrier by bolts 40, receivable in slots 41 in the carrier. A larger slot 42 permits the passage of the valve stem 44 for the air bag.

The operation of the apparatus will be apparent. Assuming that a tire has been retreaded in the apparatus as shown in Figure 2, the bolts 26 are loosened and swung out of the way, whereupon the door is moved outwardly, first in a straight line movement to the dotted line position of Figure 2, and then swung outwardly about the pivots 20. The outer tread ring 12 is removed with the door. The carrier 32 is then moved outwardly along the shaft 8, and with the carrier the tire and air bag are removed from the cavity of the vulcanizer. The ring 39 is now removed and the tire and air bag can be taken off the carrier. In replacing the cured, retreaded tire, with a fresh tire to be retreaded, the reverse operations are carried out.

It will be noted that a complete and perfect retreading operation may be carried on, the retreaded tire being entirely devoid of any transverse markings which are found in tires retreaded in sectional or segmental molds. Various tread designs may be obtained by the substitution of different tread rings and certain adaptability for various sizes of tires may be made by the substitution of different sizes of carriers and tread rings of different internal diameters which may all be substituted in a single vulcanizer.

It will also be observed that the apparatus shown and described affords a ready means of vulcanizing in air bags so as to obtain more perfect results than with other types of expanders or pressure members and that the sidewalls of the tire are supported during the vulcanizing operation so that no distortion of the tire takes place.

What is claimed is:

1. A retread vulcanizer comprising a fixed annular jacketed member formed with a cavity for tires to be treaded, a member mounted to swing toward and from said cavity and carrying an annular jacketed vulcanizer member movable axially into said cavity when said vulcanizer member is swung into line with said fixed jacketed member, one half of a circumferentially split tread molding ring supported in the cavity, the other half of said ring being carried by said swinging vulcanizer member.

2. A retread vulcanizer comprising a fixed annular jacketed member formed with a cavity for tires to be treaded, a member mounted to swing toward and from said cavity and carrying an annular jacketed vulcanizer member movable axially into said cavity when said vulcanizer member is swung into line with said fixed jacketed member, one half of a circumferentially split tread molding ring supported in the cavity, the other half of said ring being carried by said swinging vulcanizer member, and a carrier for supporting a tire from its inner periphery movable so as to carry a tire into and out of said cavity.

3. A retread vulcanizer comprising relatively movable members including one annular member formed with a cavity for a tire to be treaded, another annular member movable relatively into said cavity, one half of a circumferentially split tread molding ring being seated in said cavity, the other half of said ring being carried by said other member and adapted relatively to move into cooperation with the ring in said cavity, and a carrier for supporting a tire from its inner periphery movable so as to carry a tire into and out of said cavity.

CHARLES B. HUDSON.